US009286524B1

(12) United States Patent
Mei et al.

(10) Patent No.: US 9,286,524 B1
(45) Date of Patent: Mar. 15, 2016

(54) MULTI-TASK DEEP CONVOLUTIONAL NEURAL NETWORKS FOR EFFICIENT AND ROBUST TRAFFIC LANE DETECTION

(71) Applicants: Toyota Motor Engineering & Manufacturing North America, Inc., Erlanger, KY (US); University of Technology, Sydney, Ultimo (AU)

(72) Inventors: Xue Mei, Ann Arbor, MI (US); Danil V. Prokhorov, Canton, MI (US); Jun Li, Sydney (AU); Dacheng Tao, Ultimo (AU)

(73) Assignees: Toyota Motor Engineering & Manufacturing North America, Inc., Erlanger, KY (US); University of Technology, Sydney, Ultimo (AU)

( * ) Notice: Subject to any disclaimer, the term of this patent is extended or adjusted under 35 U.S.C. 154(b) by 0 days.

(21) Appl. No.: 14/687,820

(22) Filed: Apr. 15, 2015

(51) Int. Cl.
*G06K 9/00* (2006.01)
*G06K 9/62* (2006.01)
*G06T 7/00* (2006.01)

(52) U.S. Cl.
CPC .......... *G06K 9/00798* (2013.01); *G06K 9/6256* (2013.01); *G06T 7/0083* (2013.01); *G06T 2207/20081* (2013.01); *G06T 2207/30256* (2013.01)

(58) Field of Classification Search
CPC .................. G06K 9/00624; G06K 9/00778
See application file for complete search history.

(56) References Cited

PUBLICATIONS

Kim, Jihun, and Minho Lee. "Robust Lane Detection Based on Convolutional Neural Network and Random Sample Consensus." Neural Information Processing. Springer International Publishing, 2014.*
Fritsch, Joerg, Tobias Kuhnl, and Andreas Geiger. "A new performance measure and evaluation benchmark for road detection algorithms." Intelligent Transportation Systems-(ITSC), 2013 16th International IEEE Conference on. IEEE, 2013.*
Hartmann, Oliver, et al. "Night time road curvature estimation based on Convolutional Neural Networks." Intelligent Vehicles Symposium (IV), 2013 IEEE. IEEE, 2013.*
Hartmann, Oliver, et al. "Robust and real-time multi-cue map verification for the road ahead." Intelligent Transportation Systems (ITSC), 2014 IEEE 17th International Conference on. IEEE, 2014.*
Sun et al.; "Deep Convolutional Network Cascade for Facial Point Detection"; 2013 IEEE Conference on Computer Vision and Pattern Recognition; 2013; in 8 pages.
Hinton et al.; "Improving neural networks by preventing co-adaptation of feature detectors"; Jul. 3, 2012; in 18 pages.

(Continued)

*Primary Examiner* — Stephen R Koziol
*Assistant Examiner* — Jonathan S Lee
(74) *Attorney, Agent, or Firm* — Christopher G. Darrow; Darrow Mustafa PC (57) ABSTRACT

Disclosed herein are devices, systems, and methods for detecting the presence and orientation of traffic lane markings. Deep convolutional neural networks are used with convolutional layers and max-pooling layers to generate fully connected nodes. After the convolutional and max-pooling layers, two sublayers are applied, one to determine presence and one to determine geometry. The presence of a lane marking segment as detected by the first sublayer can serve as a gate for the second sublayer by regulating the credit assignment for training the network. Only when the first sublayer predicts actual presence will the geometric layout of the lane marking segment contribute to the training of the overall network. This achieves advantages with respect to accuracy and efficiency and contributes to efficient robust model selection.

20 Claims, 4 Drawing Sheets

(56) References Cited

PUBLICATIONS

Ranzato et al.; "A Sparse and Locally Shift Invariant Feature Extractor Applied to Document Images"; IEEE; Sep. 23-26, 2007; in 6 pages; vol. 2.

Huang et al.; "Multi-Sensor Lane Finding in Urban Road Networks"; 2009; in 8 pages.

McCall et al.; "Video-Based Lane Estimation and Tracking for Driver Assistance: Survey, System, and Evaluation"; IEEE Transactions on Intelligent Transportation Systems; Mar. 2006; in 18 pages; vol. 7, No. 1.

Sivaraman et al.; "Integrated Lane and Vehicle Detection, Localization, and Tracking: A Synergistic Approach"; IEEE Transactions on Intelligent Transportation Systems; Jun. 2013; in 12 pages.; Vo. 14, No. 2.

Kim; "Robust Lane Detection and Tracking in Challenging Scenarios"; IEEE Transactions on Intelligent Transportation Systems; Mar. 2008; in 11 pages; vol. 9, No. 1.

Geiger et al.; "3D Traffic Scene Understanding from Movable Platforms"; IEEE Transactions on Pattern Analysis and Machine Intelligence; 2013; pp. 1-14.

Krizhevsky et al.; "ImageNet Classification with Deep Convolutional Neural Networks"; in NIPS, 2012; pp. 1-9.

Siagian et al.; "Mobile Robot Navigation System in Outdoor Pedestrian Environment Using Vision-Based Road Recognition"; in ICRA, 2013; in 8 pages.

Nieto et al.; "Real-time lane tracking using Rao-Blackwellized particle filter"; Journal of Real-Time Image Processing; 2012; in 13 pages.

Lecun et al.; "Gradient-Based Learning Applied to Document Recognition"; Proceedings of the IEEE; 1998; pp. 2278-2324; vol. 86, No. 11.

\* cited by examiner

MULTI-TASK DEEP CONVOLUTIONAL NEURAL NETWORKS FOR EFFICIENT AND ROBUST TRAFFIC LANE DETECTION

BACKGROUND

Autonomous driving systems must be able to discern objects within images captured by cameras, including humans, other vehicles, and road structures. Of particular importance to the successful control and navigation of autonomous vehicles over roads and through traffic is the ability to identify boundaries of traffic lanes. While traffic lanes are usually demarcated by simple lines and patterns, it is often difficult in practice for autonomous driving systems to identify lane boundaries due to road deterioration, lighting conditions, and confusion with other objects and patterns that may be found in a traffic scene, such as other vehicles or road-side structures.

Detection of traffic lane markings is generally a multifold task involving, on the one hand, low-level feature detection within an image, and, on the other hand, high-level abstractions and models. Therefore, detection usually requires a two-step approach: detecting markings and fitting a lane model. The independent computations of low-level feature detection and high-level modelling are considered necessary because actual physical traffic lane markings are often not well delineated, particularly from the viewpoint of the driver or a vehicle camera. Therefore, existing detection methods attempt to organize candidate markings detected in real time according to pre-defined models based on the underlying structure of known traffic lanes. For example, lanes are assumed to be found in the vicinity of the vehicle and to extend in the direction along which the vehicle moves.

Previous solutions have been built on simplifying assumptions, heuristics, and robust modelling techniques. These assumptions are used to determine candidates for lanes within an image. The candidates are used to construct global lane models, which in turn are used to filter out inappropriate outliers. Filters used are generally robust model selection methods, such as RANdom SAmple Consensus (RANSAC).

However, the separation between detection of candidate markings and construction of lane models limits these existing methods' efficacy. On one hand, without sufficient context, it is often difficult to determine whether a small image patch is the border of a lane. On the other hand, unreliable detection adds to the difficulty faced by the modelling stage, which must filter out false detections and validate the inliers with global consistency. It is helpful to have more robust model selection, but robustness comes with a high computational cost. Furthermore, the more unreliable the detection, the more trials are needed to guarantee a sensible rate of success of modelling. Previous studies utilized distinctive and visually conspicuous lane markings. However, as the task becomes more complex, for example where road markings are not so clearly defined and recognizable, the performance of detectors deteriorates, and the cost of robust modelling becomes more expensive.

SUMMARY

Disclosed herein are devices, systems, and methods for detecting the presence and orientation of traffic lane markings. Deep convolutional neural networks are used with convolutional layers and max-pooling layers to generate fully connected nodes. After the convolutional and max-pooling layers, two sublayers are applied, one to determine presence and one to determine geometry. The presence of a lane marking segment as detected by the first sublayer can serve as a gate for the second sublayer by regulating the credit assignment for training the network. Only when the first sublayer predicts actual presence will the geometric layout of the lane marking segment contribute to the training of the overall network. This achieves advantages with respect to accuracy and efficiency and contributes to efficient robust model selection.

In one exemplary implementation, a computing device is disclosed, comprising: one or more processors for controlling operations of the computing device; and a memory storing data and program instructions used by the one or more processors, wherein the one or more processors are configured to execute instructions stored in the memory to: receive an image of a vehicle environment; process the image using a convolutional neural network including at least one convolutional layer, at least one max-pooling layer, and at least one fully connected layer; calculate a prediction regarding whether the image contains a traffic lane marking segment based on outputs generated by the convolutional neural network; calculate geometric characteristics of the traffic lane marking segment based on the outputs generated by the convolutional neural network; and train the convolutional neural network based on the geometric characteristics of the traffic lane marking segment only if the prediction is that the image contains a traffic lane marking segment.

In another exemplary implementation, a method is disclosed, comprising: receiving an image of a vehicle environment; processing the image using a convolutional neural network including at least one convolutional layer, at least one max-pooling layer, and at least one fully connected layer; calculating a prediction regarding whether the image contains a traffic lane marking segment based on outputs generated by the convolutional neural network; calculating geometric characteristics of the traffic lane marking segment based on the outputs generated by the convolutional neural network; and training the convolutional neural network based on the geometric characteristics of the traffic lane marking segment only if the prediction is that the image contains a traffic lane marking segment.

In another exemplary implementation, a system is disclosed, comprising: one or more cameras disposed on a vehicle; one or more processors for controlling operations of the computing device; and a memory storing data and program instructions used by the one or more processors, wherein the one or more processors are configured to execute instructions stored in the memory to: receive an image of a vehicle environment from the one or more cameras; process the image using a convolutional neural network including at least one convolutional layer, at least one max-pooling layer, and at least one fully connected layer; calculate a prediction regarding whether the image contains a traffic lane marking segment based on outputs generated by the convolutional neural network; and only if the prediction is that the image contains a traffic lane marking segment, calculate geometric characteristics of the traffic lane marking segment.

DETAILED DESCRIPTION

Disclosed herein are devices, systems, and methods for detecting the presence and orientation of traffic lane markings, using novel deep convolutional neural networks with gated sublayers for determining presence and geometry of the traffic lane markings. Specifically, the presence of a lane marking segment as detected by the first sublayer can serve as a gate for the second sublayer by regulating the credit assignment for training the network. Only when the first sublayer predicts actual presence will the geometric layout of the lane marking segment contribute to the training of the overall network.

Figure 1:
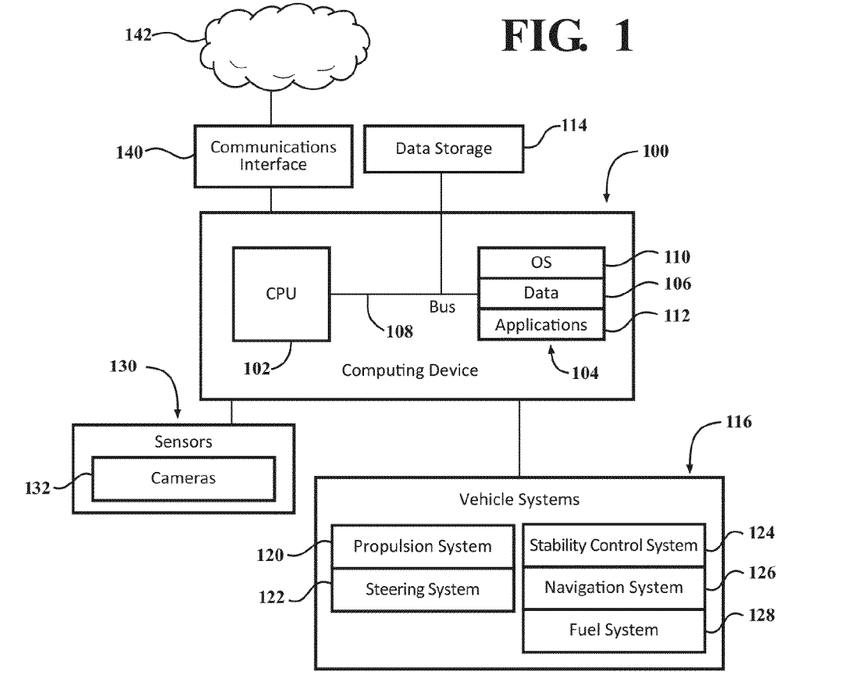
FIG. 1 is a schematic block diagram of a computing device for lane detection using a convolutional neural network.
Figure 2:
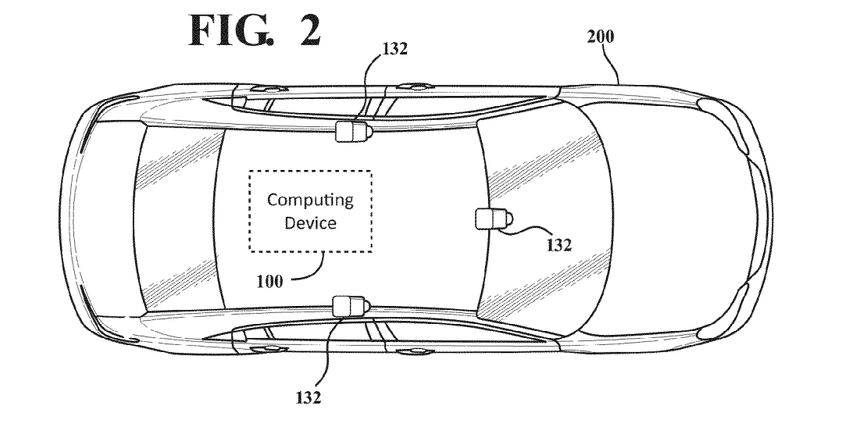
FIG. 2 is a pictorial representation of a vehicle including the computing device of FIG. 1.

FIG. 1 is a schematic block diagram of a computing device 100 associated with a vehicle 200 (such as that depicted in FIG. 2). The computing device 100 can be any type of vehicle-installed, handheld, desktop, or other form of single computing device, or can be composed of multiple computing devices. A central processing unit (CPU) 102 in the computing device 100 can be a conventional CPU or any other type of device, or multiple devices, capable of manipulating or processing information. A memory 104 in the computing device 100 can be a random access memory device (RAM) or any other suitable type of storage device. The memory 104 can include data 106 that is accessed by the CPU 102 using a bus 108.

The memory 104 can also include an operating system 110 and installed applications 112, the installed applications 112 including programs or apps that permit the CPU 102 to implement the lane detection as described below. The computing device 100 can also include secondary, additional, or external storage 114, for example, a memory card, flash drive, or any other form of computer readable medium. In one implementation, the applications 112 can be stored in whole or in part in the external storage 114 and loaded into the memory 104 as needed for processing.

The computing device 100 can be in direct or indirect communication with one or more vehicle systems 116 to control various vehicle functions. Vehicle systems 116 can include a propulsion system 120; a steering system 122; a stability control system 124; a navigation system 126; an energy system 128; and any other systems that can control various vehicle functions (such as the vehicle climate or entertainment functions, etc.). The vehicle 200 can also include interfaces for the driver to interact with the vehicle systems 116, for example, one or more interactive displays, audio systems, voice recognition systems, buttons and/or dials, haptic feedback systems, or any other means for inputting or outputting information.

The propulsion system 120 can control the engine, motor, transmission, and/or other vehicle controls that are used for driving the vehicle 200. The navigation system 126 can be used for establishing the route or directions for the vehicle, and can include maps and/or can connect to external or remote sources for determining an optimal route. The stability control system 124 can activate brakes or motors to one or more of the vehicle's wheels to maintain the stability of the vehicle, including, for example, the proper yaw of the vehicle. The energy system 128 can control the vehicle's energy usage and storage, which energy source may be in the form of gasoline, natural gas, diesel oil, batteries, fuel cells, or the like.

The computing device 100 can also be in direct or indirect communication with one or more sensors 130 that can capture data indicative of performance of the vehicle 200 and vehicle systems 116. For example, optical sensors 130 such as cameras 132 can capture image data using charge coupled devices (CCD), complementary metal oxide semiconductors (CMOS), or similar image-capturing elements, and can be configured to capture single-spectral images or multi-spectral images. Other types of sensors 130 can include accelerometers, gyroscopes, and/or magnetometers, location sensors (for example, utilizing a global positioning satellite system), climate sensors (e.g., thermometers or barometers), altitude sensors (e.g., altimeters), radar/lidar sensors, etc. Using the various sensors 130 associated with the vehicle 200, the computing device 100 can detect vehicle speed, vehicle direction, vehicle acceleration, vehicle rotation, vehicle location, environmental weather conditions, traffic conditions, and road conditions.

The computing device 100 can also include a communications interface 140 through which the computing device 100 can communicate with external sources over a communications network 142 such as the internet. These external sources can include one or more remote servers.

FIG. 2 is a pictorial representation of the vehicle 200 in direct or indirect communication with the computing device 100. The computing device 100 can be located within the vehicle 200 or can be located remotely from the vehicle 200 in an alternate location. If the computing device 100 is remote from the vehicle 200, the vehicle 200 can include the capability of communicating with the computing device 100, such as through the communications interface 140. One or more sensors 130 can be disposed on the vehicle 200, such as the cameras 132 that can communicate with the computing device 100 as described above.

The vehicle 200 can include options for operating in manual mode or autonomous mode. When the vehicle 200 is in manual mode, the driver manually controls the vehicle systems 116. In autonomous mode, on the other hand, the computing device 100 can be used to control one or more vehicle systems 116 without the driver's intervention. Some vehicles may also be equipped with a "semi-autonomous mode," in which operation of the vehicle 200 is shared between the driver and the computing device 100. For example, the driver can control certain aspects of the vehicle operation, such as steering, while the computing device 100 can control other aspects of the vehicle operation, such as braking and acceleration. When the vehicle 200 is operating in autonomous (or semi-autonomous) mode, the computing device 100 issues commands to the various vehicle systems 116 to direct their operation, rather than such vehicle systems 116 being controlled by the driver.

Operating the vehicle 200 requires up-to-date knowledge of the environment around the vehicle 200. For example, the computing device 100 must be aware of where the proper travel lanes are on the road. This requires knowing the position of lane markings, which define the contours and boundaries of the travel lanes. In practice, it is often difficult to discern lane markings in captured images due to road deterioration, lighting conditions, and confusions with irrelevant objects in a traffic scene, such as spurious patterns from vehicles or other road-side structures. Thus, detection of traffic lane markings requires real-time analyses of images taken of the surrounding environment, captured, for example, by the cameras 132.

Figure 3:
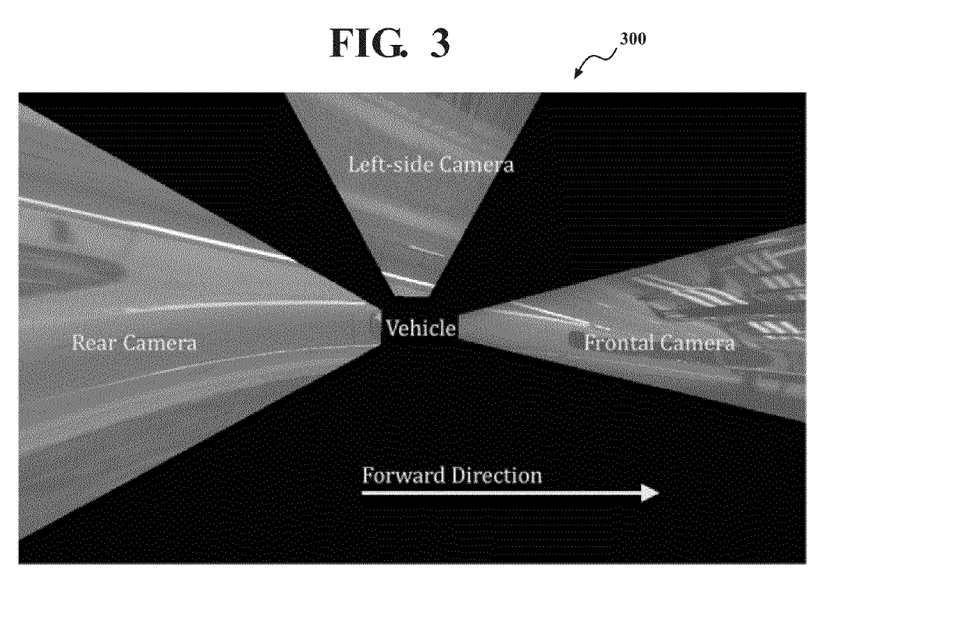
FIG. 3 is a pictorial representation of an image that can be analyzed by the convolutional neural network to detect traffic lane markings.

FIG. 3 is an exemplary image 300 that can be analyzed using the disclosed implementations. For example, the image 300 is a composite of three different images captured by three cameras 132 disposed on the vehicle 200, calibrated to point toward the front, left, and rear sides of the vehicle 200, respectively. The image 300 can be formatted as an inverse-perspective mapped image, also known as a bird's eye view, which can more accurately represent and approximate the surrounding road surface. In one exemplary implementation, the cameras 132 can be configured to cover an area of approximately 100×60 square meters.

In one exemplary implementation, the image 300 can be a grayscale image. Because a grayscale image has only one channel, using a grayscale image as input can result in the most straightforward application of the exemplary implementations described below. However, the disclosed implementations can readily be adapted to accept images of multiple channels (such as channels representing individual color components), as will be appreciated by those skilled in the art. Accordingly, in another exemplary implementation, a multi-channel image 300 can be used.

Figure 4:
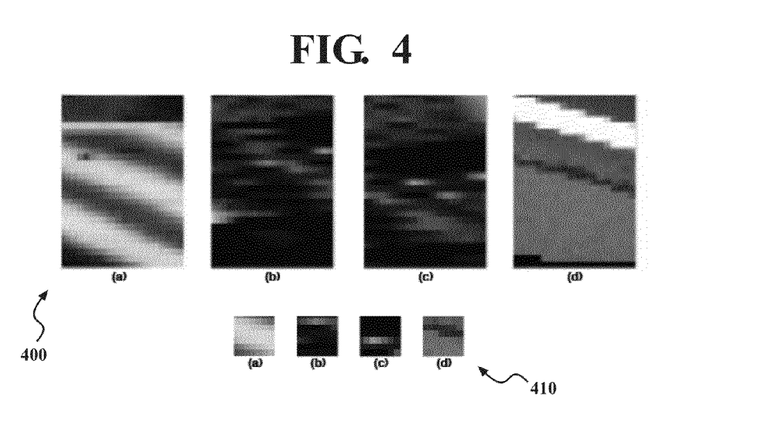
FIG. 4 is a pictorial representation of image samples that can be analyzed by the computing device of FIG. 1.

FIG. 4 includes a set of example image samples 400(a)-(d) that can be used as inputs for a convolutional neural network, such as the one disclosed here. The computing device 100 can be configured to divide the image 300 (or other images of a road surface captured by the cameras 132) into samples or patches of a predefined size. Each sample 400(a)-(d) represents a region of interest in the roadway and can be used as an initial input feature map for the analyses described below. In one exemplary implementation, the resolution of the samples 400(a)-(d) can be set at 28×20 pixels. The efficiency and cost effectiveness of the disclosed implementations allow for analysis of much larger input samples at much lower computational costs. In comparison, existing (prior art) detection algorithms used in a lane detection context typically utilize smaller sample sizes. One commonly used size for input samples is 7×7 pixels, as illustrated by the smaller samples 410(a)-(d) (the smaller 7×7 pixel samples 410(a)-(d) are segments extracted from the corresponding larger 28×20 pixel samples 400(a)-(d), respectively). Using larger samples as the region of interest can reveal more of the surrounding roadway and thus can contain more information and contextual cues, which can be used to resolve ambiguities, as can be seen by comparing the larger samples 400(a)-(d) to the smaller samples 410(a)-(d). The ability to process large samples with lower computational cost is thus one advantage of the disclosed implementations over the prior art, as described in more detail below.

Figure 5:
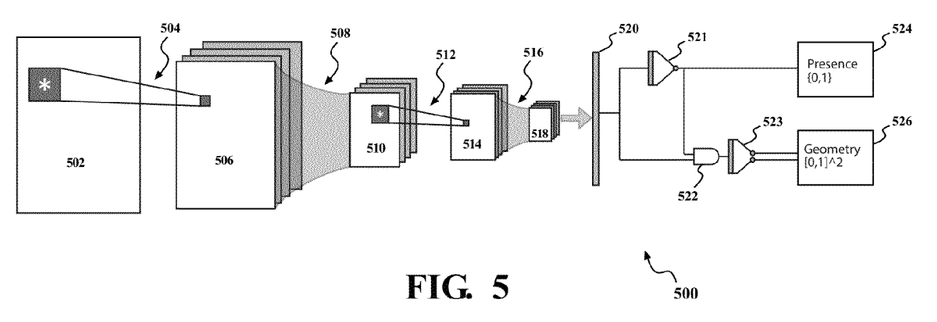
FIG. 5 is a schematic block diagram of the convolutional neural network used to detect traffic lane markings in accordance with the disclosed implementations.

FIG. 5 is logical representation of an exemplary multi-tasking convolutional neural network 500 in accordance with the disclosed implementations. The network 500 begins using the classic convolutional neural network architecture, as is familiar in the art (known as the LeNet architecture, described in Y. LeCun, L. Bottou, Y. Bengio, and P. Haffner, "Gradient-Based Learning Applied to Document Recognition," *Proceedings of the IEEE*, vol. 86, no. 11, pp. 2278-2324, 1998, which is hereby incorporated by reference), but then diverges to create a novel, improved hierarchy, as described below.

The initial input into the network 500 can be one or more input feature maps 502, each of which can be a sample extracted from the image 300 captured by the cameras 132. In one exemplary implementation, the size of each sample used can be 28×20 pixels, as in the samples 400(a)-(d) depicted in FIG. 4. Other sample sizes can also be used, depending on the application and processing resources available.

The input feature map 502 can first be processed by a convolutional layer 504 which can contain an array of variables spatially arranged corresponding to a respective region of interest within the image 300. The convolutional layer 504 can be used to generate a set of output feature maps 506 by applying a 2-dimensional convolution filter in which a set of coefficients (or kernel) is used by the layer to calculate an output based on the information present in the input feature map 502. This causes the neurons (which are units or nodes) at each given location in each output feature map 506 to be activated by the total responses to the filter across the entire input feature map 502. In one exemplary implementation, an output feature maps 506 can include a nonlinear map h of the activation levels of the individual units, defined as:

$$h_{i,j}^q = \sigma(a_{i,j}^q) \quad \text{(Eq. 1)}$$

where $a_{i,j}^q$ is the total input of a unit at (i, j) on the respective output feature map 506 (and q refers to the indexing neurons in an output layer). The activation level is a value tied to the presence or absence of a traffic lane marking within the input feature map 502. The sigmoid function:

$$\sigma(a) = 1/(1 + e^{-a}) \quad \text{(Eq. 1a)}$$

can be used for the nonlinear map applied to the filter responses. The activation can be defined by the following linear function (with the input signal being linearly combined together):

$$a^q = \sum_p x^p \times w^{q,p} + b^q \quad \text{(Eq. 2)}$$

where p refers to the indexing neurons in a given input layer and q refers the indexing neurons in a given output layer, and therefore $w^{q,p}$ means a K×K matrix of coefficients in the convolutional kernel connecting a pair of input/output layers, which specifies the weights associated with the connections between respective neurons between the input and output layers. The term $b^q$ is the bias term of the output layer and is used to shift the entire input signal to the appropriately conducive value range of the output layer. The term x refers to the variable element in the input signal. The convolution of the layer can be defined by:

$$a_{i,j}^q = (xw)_{i,j} = \sum_{r,s=1}^{K} w_{r,s}^{q,p} x_{i-r+1, j-s+1}^p \quad \text{(Eq. 3)}$$

The convolutional layer 504 imposes scarcity conditions on the connections between input $x^p$ and output $a^q$, which means the connections are confined within K×K local areas. This preserves spatial structure of the signal and simplifies the model complexity. In addition, each kernel w can be trained (as described in more detail below) to generate useful local descriptors that act as filters by preserving relevant information while discarding irrelevant information. These kernels are designed to be universally applicable to the entire region of interest bounded by the input feature map 502.

In one exemplary implementation, the convolutional layer 504 can be configured to utilize a filter size of 5×5 pixels to produce twenty (20) output feature maps 506 from a single input feature map 502. According to one exemplary implementation using an input feature map 502 size of 28×20 pixels, the size of each of the twenty (20) output feature maps 506 can be 24×16 pixels. For each respective dimension, the output size can be calculated as the input size–the filter/kernel size+1 (so 28−5+1=24 and 20−5+1=16).

The convolutional layer 504 can be followed by a max-pooling layer 508 to downsample the output feature maps 506, which can reveal the highest activation values in the output. The max-pooling layer 508 can be defined by the following function y:

$$y_{i,j}^q = \max(\{h_{i',j'}^q\}_{(i',j') \in A_{i,j}}) \quad (Eq. 4)$$

where $y_{i,j}^q$ represents a node resulted out of pooling the nodes of the convolutional layer 504. The max-pooling layer 508 takes the peak response (meaning the highest activation levels), among an area $A_{i,j}$, which is generally a block in the output feature maps 506 defined by:

$$A_{i,j} := \{(i',j') | i' \in [(i-1)m, im], j' \in [(j-1)m, jm]\} \quad (Eq. 4a)$$

where m represents the block size. The max-pooling layer 508 creates competition among neighboring nodes in the output feature maps 506, with only the highest activation levels passed to subsequent layers. This also allows more efficient assignment of credit (of improving prediction) to the previous layers in a net during the training process. The training process can be performed using the classical back-propagation algorithm, as described in the LeNet article referenced above ("Gradient-Based Learning Applied to Document Recognition"). In short, the network 500 is trained by assigning credit to the layer-defining weights according to their contribution to the loss functions (such as the loss functions described below), and adjusting the weights such that the predictions made by the network 500 best match the given target values corresponding to the content of the input feature map 502. Weight credits are partial derivatives of a loss function with respect to each such weight, computed by the forward and backward pass. The weights adjustments thus cause the outputs for each respective input feature map 502 to more accurately approximate the corresponding prediction targets.

The max-pooling layer 508 downsamples the output feature maps 506 to produce downsampled feature maps 510. In one exemplary implementation, the max-pooling can take place within every 2×2 block in the output feature maps 506 and can downsample the feature maps by a factor of 2. Accordingly, the size of downsampled feature maps 510 output by the max-pooling layer 508, can be 12×8 pixels.

The network 500 can include any number of convolution layers 504, with each convolution layer followed by a max-pooling layer 508. At each level, the downsampled feature maps outputted by one max-pooling layer become the input to the next convolution layer. In the example illustrated in FIG. 5, the network 500 can include two levels. The first level includes the convolution layer 504 and max-pooling layer 508 described above. The second level includes a second convolution layer 512, which takes the first downsampled feature maps 510 as input. The second convolution layer 512 can process the data in the same manner as the first convolution layer 504 in one exemplary implementation using a filter size of 3×3 pixels. This second convolution layer 512 can be configured to produce ten (10) output feature maps 514 with a size of 10×6 pixels each. Accordingly, the filter is specified by a weight of 10×20×3×3 pixels, and each output feature map 514 is generated by combining the respective filter response from the twenty (20) inputs (that is, the outputs from the first max-pooling layer 508). This can be followed by a second max-pooling layer 516 which can downsample these output feature maps 514 to generate a second set of downsampled feature maps 518 of size 5×3 pixels each.

Following the last max-pooling layer (in this example, the second max-pooling layer 516), the data can be processed with a fully connected layer which acts as a perceptron to integrate all the previously processed information and flatten the structure of all feature maps. In the fully connected layer, the output linear combination of the input nodes is followed by a nonlinear transformation defined by the following function z:

$$z_i = \sigma\left(\sum_j w_{i,j} y_j + b_i\right) \quad (Eq. 5)$$

where $w_{i,j}$ represents the coefficient between the j-th input unit and the i-th output unit, and $b_i$ represents the bias for the i-th output unit. The output can be one or more fully connected node sets 520. In one implementation, this can include sixteen (16) nodes that are fully connected to 150 output nodes generated from the previous layer. Accordingly, in this example, the fully connected layer can be defined by:

$$z_j^{(5)} = \sigma\left(\sum_{l=1}^{150} w_{j,l}^{(5)} y_l^{(4)} + b_j^{(5)}\right) \quad (Eq. 6)$$

where $\{y_l^{(4)}\}_{l=1}^{150}$ denotes the outputs of the convolution and max-pooling layers and $\{z_j^{(5)}\}_{j=1}^{16}$ represents hidden nodes in the resulting set of nodes.

In one exemplary implementation novel to this disclosure, the fully connected layer can be used to create two (2) fully connected node sets 520, in which each of the sixteen (16) nodes can be connected to two different sets of upper-layer nodes. The network 500 can thus be caused to fork into two sublayers, wherein each of the fully connected node sets 520 can have different configurations/weights and can be processed by each of the sublayers separately and in parallel. Moreover, a logical gate 522 can be applied between the two sublayers to add a conditional element to the network, as follows.

In one exemplary implementation, the two sublayers applied to the fully connected node set 520 are a presence layer 524 and a geometry layer 526. In the presence layer 524, logistic regression 521 is applied. In accordance with the example network 500 described above (in which the fully connected node set 520 contains sixteen (16) fully connected nodes at the 5th layer of the network 500), presence of a lane marking can be defined using the following equation:

$$p = \sigma\left(\sum_{j=1}^{16} w_j^{(6)} z_j^{(5)} + b^{(6)}\right) \quad (Eq. 7)$$

where p is a value indicating the probability (a value between 0 and 1) that the region of interest contains a visible section of lane marking. The network 500 then calculates a classification result determining whether there is or is not a lane marking present. This binary target (either 0 or 1) is compared with network's 500 probability prediction above to determine the magnitude of the error, also known as the loss of the classification or prediction. If the prediction target differs from the classification, the assigned weights are adjusted for subsequent inputs in the back-propagation training process so that the prediction results move closer to the classification results. The loss of the classification/prediction can be computed as an error represented by the negative log-likelihood:

$$L^C = -\log p^g (1-p)^{1-g} \quad (Eq. 8)$$

where g refers to the binary classification (i.e., g∈{0,1}) in which a result of 0 means there is no lane marking and 1 means there is a lane marking within the region of interest (that is, the initial 28×20 pixel input feature map 502).

In the geometry layer 526, the orientation and position of the lane marking segment can be determined. The geometry layer 526 can be a 2-dimensional regression layer 523. In accordance with the example network 500 described above (in which the fully connected node set 520 contains sixteen (16) fully connected nodes at the 5th layer of the network 500), the geometry of the lane marking can be defined using the following equation:

$$q_m = \sigma\left(\sum_{j=1}^{16} w_{m,j}^{(6)} z_j^{(5)} + b_m^{(6)}\right)$$ (Eq. 9)

where m refers to an index corresponding to attributes of orientation and position (and therefore m∈{1,2}). The regression targets q are real numbers between 0 and 1 corresponding to the geometric layout of the lane marking segment. In one exemplary implementation, the geometry of the lane marking segment can be coded as (d, θ) and specified by two parameters: (i) the distance (d) of the lane segment from the center of the region of interest, and (ii) and the direction of the lane segment specified by its angle (θ) in relation to a horizontal axis.

The loss of regression (which is the loss function of the geometry layer 526) can represent the squared errors between the predictions and the true targets, defined as follows:

$$L^R = \|q - f\|^2$$ (Eq. 10)

where f refers to image descriptors representing the true geometric configuration (that is, the true orientation and position).

Due to the novel branched nature of the final stages of the network 500, desirable image descriptors can preserve relevant information while discarding irrelevant information, and thus can capture sufficient low-level characteristics to benefit generic analysis, meaning the resultant features can inform and be used for subsequent predictions in a broad sense. For example, the first layers (i.e., the convolution layers and max-pooling layers) can compute local descriptors, which can then be shared by the fully connected layer and the two sublayers (i.e., the presence layer 524 and the geometry layer 526). In the sublayers, two distinct sets of neurons can be used to interpret the image descriptors in accordance with each sublayer's respective task, as described.

The disclosed implementations provide advantages over the prior art both in forward propagation and backward propagation (i.e., training) of the network 500. For the forward pass, the function of the geometry layer 526 can be conditioned on the presence layer 524 in that the features produced by the second max-pooling layer 516 (or if there are more than two max-pooling layers, the final such layer) are only subjected to the geometry layer 526 when the presence layer 524 has made a positive prediction. In one exemplary implementation, the two sublayers can be run at the same time, which can increase efficiency of the network 500, and the geometric estimation produced by the geometry layer 526 can be applied if actual presence is determined or discarded if the presence prediction turns out to be negative. For the backward pass, i.e., in assigning credit to train the network 500, the loss of regression calculated in the geometry layer 526 is only used to assign credit when the region of interest actually contains a segment of a lane marking. The convolution and max-pooling layers are thus trained by determining whether such layers are responsible for the regression loss. Accordingly, the presence of a lane marking enables the logical gate 522 that regulates the credit assignment in the network 500.

The disclosed implementations can provide significant efficiency and accuracy advantages over the prior art. For example, it is often impractical to perform a dense analysis on large image files. However, as disclosed, the network 500 is able to forego large portions of the overall image based on the conditional processing of the presence layer 524. Accordingly, larger samples can be used as input for the network 500 than are available to other detection methods, at the same computational cost. For example, while other detection methods generally use samples no larger than 7×7 pixels, the network 500 can use much larger samples, for example, samples that are 28×20 pixels. In addition, as described above with reference to FIG. 4, the larger sample sizes allow more information and local contextual cues to be included in the analysis, which increases accuracy and minimizes ambiguities. Thus, the network 500 is both sophisticated and computationally affordable, particularly as compared with prior art methods.

Figure 6:
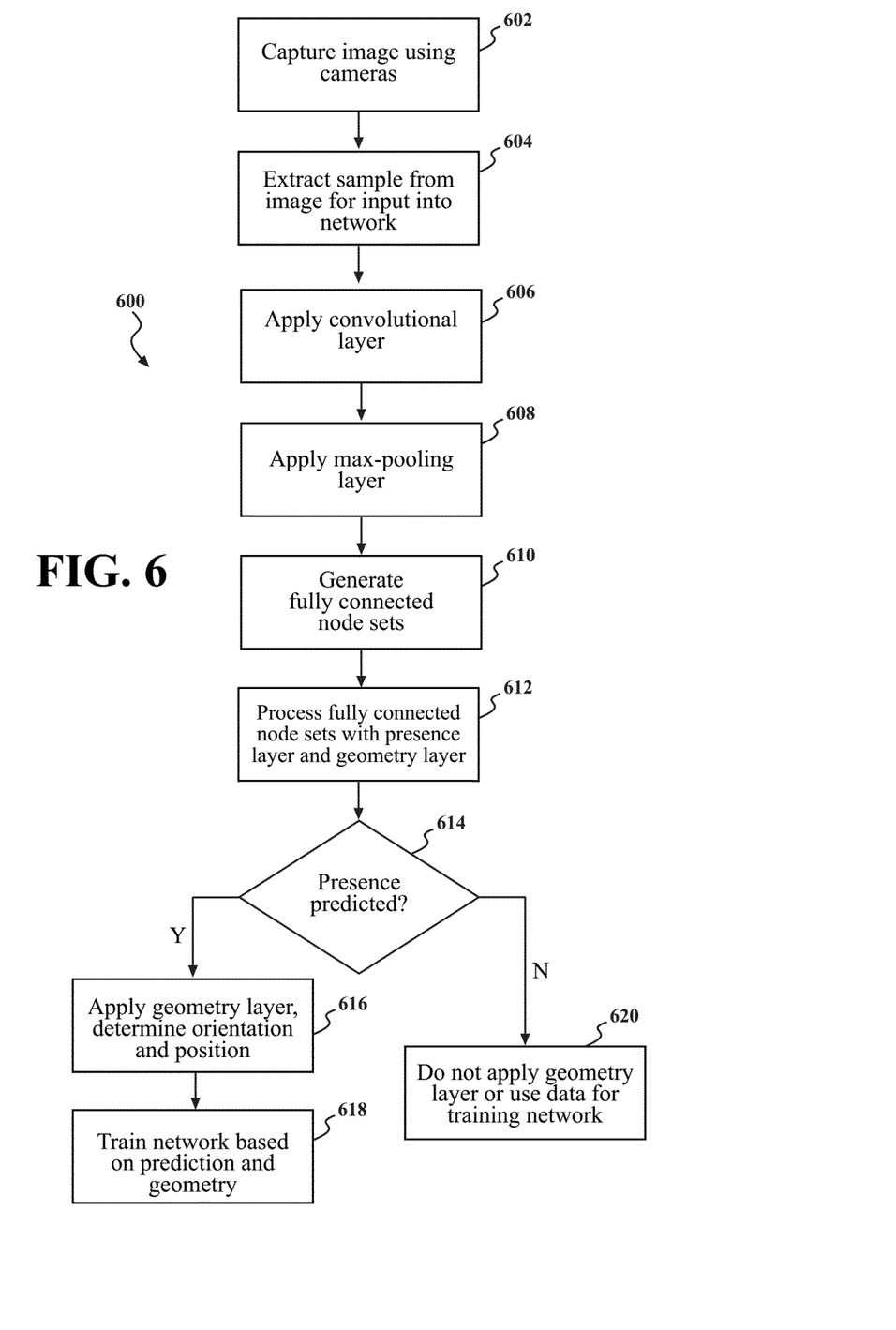
FIG. 6 is a logic flowchart of a process used to detect traffic lane markings.

FIG. 6 is a logic flowchart depicting a process 600 for detecting lane markings using a convolutional neural network such as the network 500 described above. At step 602, the image 300 is captured, for example using cameras 132 disposed on the vehicle 200. At step 604, a sample is extracted from the image 300 to be used as an input feature map 502. At step 606, a convolutional layer 504 is applied to the input feature map 502, resulting in a set of output feature maps 506. At step 608, a max-pooling layer 508 is applied to the output feature maps 506, resulting in downsampled feature maps 510. Optionally, more levels comprising rounds of convolutional layers and max-pooling layers can be applied to the data at this point. At step 610, the fully connected node set 520 can be generated containing nodes that include two different sets of connections to upper-layer nodes (including with each fully connected node set 520 having different configurations or weights).

In one implementation, at step 612, the presence layer 524 and the geometry layer 526 are applied to each one of the fully connected node sets 520, respectively. At step 614, a determination is made in the presence layer 524 as to whether a lane marking exists. At step 616, the geometry layer 526 is applied to the other fully connected node set 520 to determine the orientation and position of the lane marking only if the presence layer 524 returned an affirmative prediction (i.e., that a lane marking exists). At step 618, the network 500 is trained using the loss function and respective weights determined by the geometry layer 526. On the other hand, if, at step 614, the presence layer 524 returns a negative prediction (i.e., that there is no lane marking), then, at step 620, the geometry layer 526 and any result thereof are discarded and data resulting from the geometry layer 526 is not applied for prediction and is also not used in the training of the network 500.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims. The scope of the claims is thus to be accorded the broadest interpretation so as to encompass all such modifications and equivalent structures as is permitted under the law.

What is claimed is:

1. A computing device comprising:
one or more processors for controlling operations of the computing device; and
a memory storing data and program instructions used by the one or more processors, wherein the one or more processors are configured to execute instructions stored in the memory to:
receive an image of a vehicle environment;
process the image using a convolutional neural network including at least one convolutional layer, at least one max-pooling layer, and at least one fully connected layer;
calculate a prediction regarding whether the image contains a traffic lane marking segment based on outputs generated by the convolutional neural network;
calculate geometric characteristics of the traffic lane marking segment based on the outputs generated by the convolutional neural network; and
train the convolutional neural network based on the geometric characteristics of the traffic lane marking segment only if the prediction is that the image contains the traffic lane marking segment.

2. The computing device of claim 1, wherein the image of the vehicle environment is received from one or more cameras disposed on a vehicle.

3. The computing device of claim 1, wherein the image of the vehicle environment includes a road surface.

4. The computing device of claim 1, wherein the image of the vehicle environment is a sample extracted from a larger image.

5. The computing device of claim 4, wherein the larger image is a composite image incorporating data received from a plurality of cameras.

6. The computing device of claim 4, wherein the larger image is an inverse perspective map.

7. The computing device of claim 1, wherein the convolutional neural network includes at least two convolutional layers and at least two max-pooling layers.

8. The computing device of claim 1, wherein the convolutional neural network processes the image using 2-dimensional convolutions.

9. The computing device of claim 1, wherein the geometric characteristics of the traffic lane marking segment include orientation and position.

10. The computing device of claim 1, wherein the one or more processors are further configured to execute instructions to:
control one or more vehicle systems based on at least one of the prediction and the geometric characteristics.

11. A method comprising:
receiving an image of a vehicle environment;
processing the image using a convolutional neural network including at least one convolutional layer, at least one max-pooling layer, and at least one fully connected layer;
calculating a prediction regarding whether the image contains a traffic lane marking segment based on outputs generated by the convolutional neural network;
calculating geometric characteristics of the traffic lane marking segment based on the outputs generated by the convolutional neural network; and
training the convolutional neural network based on the geometric characteristics of the traffic lane marking segment only if the prediction is that the image contains the traffic lane marking segment.

12. The method of claim 11, wherein the image of the vehicle environment is received from one or more cameras disposed on a vehicle.

13. The method of claim 11, wherein the image of the vehicle environment includes a road surface.

14. The method of claim 11, wherein the image of the vehicle environment is a sample extracted from a larger image incorporating data received from a plurality of cameras.

15. The method of claim 14, wherein the larger image is an inverse perspective map.

16. The method of claim 11, wherein the convolutional neural network includes at least two convolutional layers and at least two max-pooling layers.

17. The method of claim 11, wherein the convolutional neural network processes the image using 2-dimensional convolutions.

18. The method of claim 11, wherein the geometric characteristics of the traffic lane marking segment include orientation and position.

19. The method of claim 11, further comprising:
controlling one or more vehicle systems based on at least one of the prediction and the geometric characteristics.

20. A system comprising:
one or more cameras disposed on a vehicle;
one or more processors for controlling operations of the computing device; and
a memory storing data and program instructions used by the one or more processors, wherein the one or more processors are configured to execute instructions stored in the memory to:
receive an image of a vehicle environment from the one or more cameras;
process the image using a convolutional neural network including at least one convolutional layer, at least one max-pooling layer, and at least one fully connected layer;
calculate a prediction regarding whether the image contains a traffic lane marking segment based on outputs generated by the convolutional neural network; and
only if the prediction is that the image contains the traffic lane marking segment, calculate geometric characteristics of the traffic lane marking segment.

* * * * *